Nov. 7, 1933.  J. E. COOPER  1,933,708
VENETIAN BLIND TOP RAIL TILTING DEVICE
Filed Oct. 12, 1932
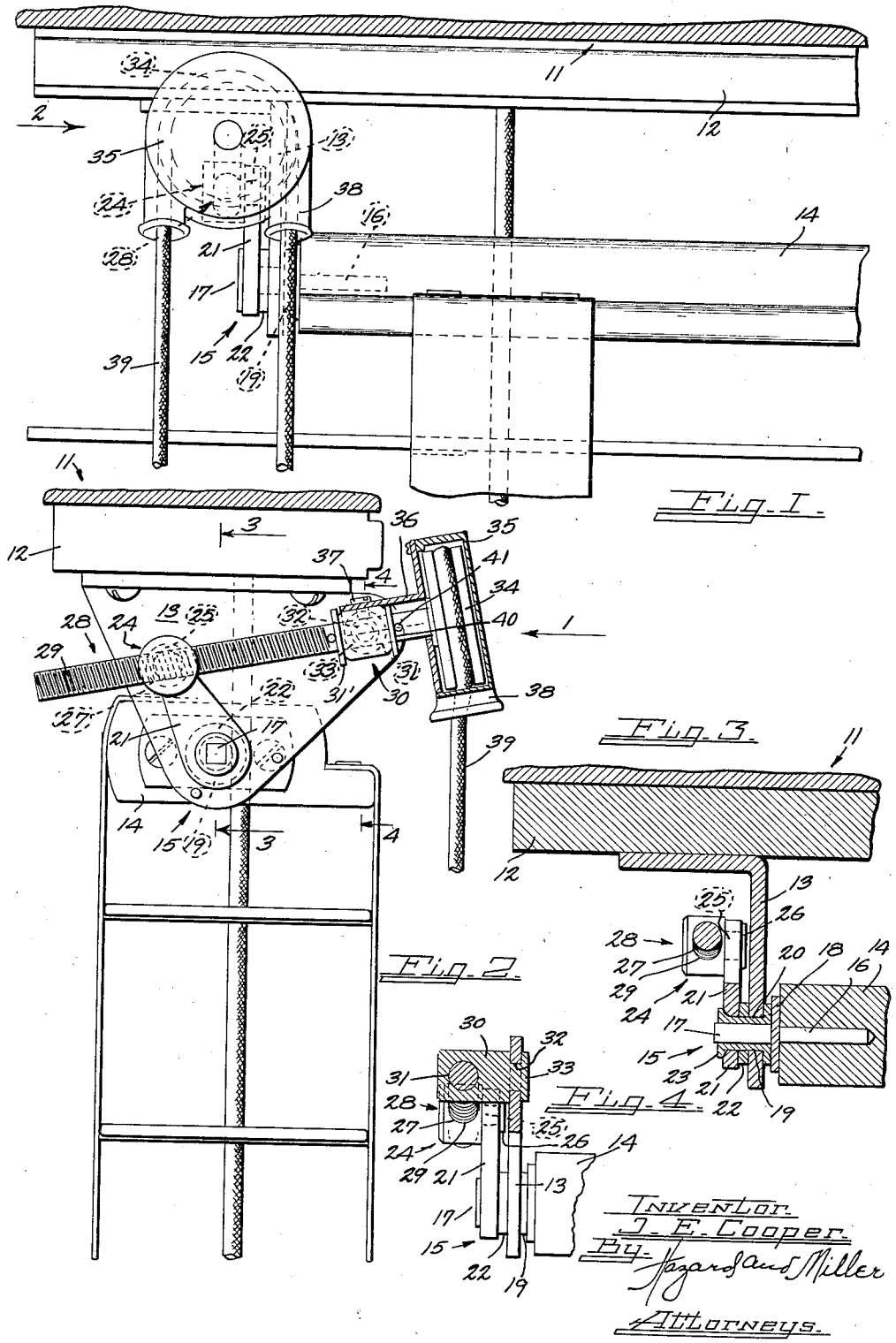

Patented Nov. 7, 1933

1,933,708

UNITED STATES PATENT OFFICE 1,933,708

VENETIAN BLIND TOP RAIL TILTING DEVICE

Jesse E. Cooper, Los Angeles, Calif., assignor to Western Venetian Blind Co., Los Angeles, Calif., a corporation of Delaware Application October 12, 1932. Serial No. 637,453

10 Claims. (Cl. 156—17)

My invention relates to a top rail tilting device for a venetian blind of a type in which one of two depending cords may be pulled and by operating a pulley and rotating a shaft may cause a tilting of the top rail and thus cause a movement of the vertical suspending tapes and cross webs to tilt the bottom rail and intermediate slats.

In this type of device an object and feature of my invention is operating a screw to allow, preferably, a swiveling action, and causing the screw to move a crank, which crank is connected to a shaft forming the axial pivot for the top rail of the blind and thereby pivoting the blind. In more detail, more specific features of my invention relate to using a bracket construction secured to a slat attached to the soffit of the window opening and on this bracket there is a pivotally mounted journal stud through which extends a screw. This screw is provided with a pulley operated by the two depending cords. The screw in its turn operates through a threaded pin connected to a crank, and the crank is connected to the axle of the top rail.

My invention is illustrated in the accompanying drawing, in which:

Fig. 1 is an elevation from the inside taken in the direction of the arrow 1 of Fig. 2.

Fig. 2 is an end elevation taken in the direction of the arrow 2 of Fig. 1.

Fig. 3 is a vertical section on the line 3—3 of Fig. 2 in the direction of the arrows.

Fig. 4 is a detail vertical section on the line 4—4 of Fig. 2 in the direction of the arrows.

Referring first to Figs. 1, 2, and 3, the soffit of the window is designated at 11, to which there is attached a slat 12. From this slat there are a pair of brackets 13 which form the journal for the top rail 14 of the blind. This journal construction has an axle 15 with a pin 16 driven in the end of the top rail. The outer end 17 of this pin is squared. The pin either passes through a squared opening in a plate 18 or this plate may be formed integral with the pin. On the squared end of the pin there is a bushing 19, this bushing forming a bearing for the circular opening 20 in the bracket 13. On the outer end of the bushing there is secured a crank arm 21 spaced from the bracket by a washer 22. The outer end of the bushing is illustrated as swedged outwardly similar to a rivet 23 to hold the arm 21 in place. By this construction the top rail may swivel or rotate on its axis on the two brackets 13, one at each end, the plate 18 being secured to the end of the rail by screws or the like.

The end of the crank arm 21 is provided with a threaded swivel pin 24, this having a swivel connection 25 with the end of the crank arm 21 and being held in place by a head 26. The screw threads 27 extend diametrically through this pin.

An operating screw 28 has a screw threaded section 29 operating through the screw section 27 of the pin 24, and this screw is journaled in a journal stud 30, which stud has a cylindrical perforation 31. A pair of collars 31' on the screw maintain this from longitudinal movement. The stud has a contracted neck 32 passing through the perforation in the bracket 13 and a head 33 to hold the stud in place. This stud allows the screw 29 to swivel on the bracket 13.

The means for operating the screw comprises a pulley 34 mounted on the end of the screw 28. This pulley is housed in a pulley housing 35, which housing has a plate 36 at the back secured by a pin 37 to the journal stud 30. The housing has two depending sections 38 through which operate the two ends 39 of the tilting cable, one end of which may be pulled downwardly while the other lifts.

The operation of my invention is as follows:

In pulling on one or other of the cable ends 39, the action rotates the puley 34 in one direction or another, consequently, turns the screw, and this screw operating through the threaded swivel pin 24 causes this pin to move and, hence, swing the crank arm 21. The crank arm being rigidly secured to the bushing 19 which is on the squared end 17 of the axle will cause a tilting of the top rail of the blind. In the action of the swivel pin swinging in an arc, necessarily the screw 28 must oscillate and this oscillation is by means of the journal stud 30, through which the shaft passes and is journaled. This allows a rocking movement of the screw and also the pulley. However, on account of the guide housing on the pulley, the cable or cords are maintained in the pulley groove and there is no danger even when the top rail is tilted to its fullest extent of the cable overriding the pulley.

In order to prevent longitudinal movement of the screw 28 in the journal stud 30 I provide two washers 40 on opposite sides of the stud and a pin 41 through the screw adjacent each washer. Thus the screw can rotate in the stud but is prevented from longitudinal movement through the stud.

Various changes may be made in the details of construction without departing from the scope of the invention as defined by the appended claims.

I claim:

1. In a venetian blind having a pair of brackets adapted for attachment to the soffit of a window, and a top rail of the blind pivotally mounted in the brackets, one of the pivotal mountings forming an axle, a pulley having a cord passing thereover with two depending ends combined with a crank connected to the axle and having a swivel pin at one end, a screw connected to the pulley and operating through said swivel pin to move the pin and hence oscillate the arm and tilt the rail on its longitudinal axis.

2. In a venetian blind as claimed in claim 1, the screw being journaled on a journal stud pivotally mounted on one of the brackets to permit oscillation of the screw during oscillation of the crank.

3. In a venetian blind, the combination of a bracket adapted for attachment to the soffit of a window, a top rail pivotally mounted in said bracket, the pivotal mounting forming an axle rigidly connected to the rail, a crank arm connected to the axle to tilt the rail, a swivel pin mounted on the end of the crank arm, the axis of the pin being parallel to the axle, the pin having a threaded perforation with a screw extending therethrough, a journal stud having a perforation with a screw extending therethrough, said stud being journaled on one of the brackets, a pulley on the end of the screw having a cord with two depending ends passing thereover whereby on rotation of the pulley the rotation of the screw oscillates the crank arm, and the oscillation of the crank arm oscillates the screw in a vertical plane.

4. In a venetian blind as claimed in claim 3, a pulley housing secured to the swivel stud and forming a guide on the pulley for the cord.

5. In a venetian blind, a bracket adapted for attachment to the soffit of an opening, a top rail pivoted in said bracket, the pivot forming an axle, a screw rotatably mounted on a swivel stud extending outwardly from one of the brackets, the axis of the stud being parallel to the axle of the rail, means to rotate the screw, means operatively connected between the screw and the axle to rotate the rail on its longitudinal axis, said screw having an oscillating movement in a vertical plane by medium of the swivel stud.

6. In a venetian blind as claimed in claim 5, the operative connection between the screw and the axle comprising a crank arm on the axle having a swivel pin thereon, the axis of the pin being parallel to the axle, said pin having a threaded perforation, and the screw operating in said threads.

7. In a venetian blind having a top rail, a bracket adapted to be supported from the soffit of a window, an axle pin journaled in said bracket and secured to the top rail, a crank connected to the axle, a screw pivotally mounted on the bracket, means to rotate said screw, and a driving connection between the screw and the crank.

8. In a venetian blind, a bracket having means for attachment to a window soffit and having an axle adapted for attachment to the top rail of a blind, a screw pivotally mounted on the bracket to swing vertically, means to rotate said screw, and a drive connection between the screw and the axle to rotate said axle.

9. In a venetian blind, a bracket adapted for attachment to a window, an axle rotatably mounted in the bracket and adapted for connection to the top rail of a blind, a journal stud mounted on the bracket, a screw extending therethrough, said journal stud forming a pivot for the screw to oscillate on said stud, means to rotate the screw, a crank arm, and a driving connection between the crank arm and the screw.

10. In a venetian blind as claimed in claim 9, said driving connection comprising a swivel pin secured to the crank arm, the screw extending through said pin and being threaded therein.

JESSE E. COOPER.